United States Patent
Regelmann

(10) Patent No.: US 12,016,746 B2
(45) Date of Patent: Jun. 25, 2024

(54) ORTHODONTIC EXPANSION SCREW

(71) Applicant: Bernhard Foerster GmbH, Pforzheim (DE)

(72) Inventor: Michael Regelmann, Neulingen (DE)

(73) Assignee: Bernhard Foerster GmbH, Pforzheim (DE)

( * ) Notice: Subject to any disclaimer, the term of this patent is extended or adjusted under 35 U.S.C. 154(b) by 406 days.

(21) Appl. No.: 17/444,590

(22) Filed: Aug. 6, 2021

(65) Prior Publication Data
US 2021/0361390 A1 Nov. 25, 2021

Related U.S. Application Data

(63) Continuation of application No. PCT/EP2020/053201, filed on Feb. 7, 2020.

(30) Foreign Application Priority Data

Feb. 11, 2019 (DE) ...................... 10 2019 103 348.9

(51) Int. Cl.
*A61C 7/10* (2006.01)
(52) U.S. Cl.
CPC ...................................... *A61C 7/10* (2013.01)
(58) Field of Classification Search
CPC ........ A61C 7/10; A61C 7/00; A61M 5/31501; A61M 5/347; A61M 2039/1027; A61M 2039/1033; A61M 2039/1038; A61M 39/283; F16B 39/32
See application file for complete search history.

(56) References Cited

U.S. PATENT DOCUMENTS

| 742,466 A | * | 10/1903 | Marshall | |
| 930,450 A | * | 8/1909 | Zinow | |
| 3,208,493 A | * | 9/1965 | Holmes | F16B 39/32 411/948 |
| 3,311,147 A | * | 3/1967 | Walker | F16B 33/02 411/278 |

(Continued)

FOREIGN PATENT DOCUMENTS

| DE | 43 38 986 A1 | 5/1994 |
| DE | 195 18 846 A1 | 9/1996 |

(Continued)

*Primary Examiner* — Heidi M Eide
*Assistant Examiner* — Lina Faraj
(74) *Attorney, Agent, or Firm* — Orbit IP

(57) ABSTRACT

An orthodontic expansion screw has two bodies, the mutual distance of which can be changed by a spindle. The spindle has an actuating part with a threaded part engaged in a threaded bore of one of the two bodies. A straight-line guiding means engage both bodies and prevent a relative rotation of the bodies and prevent inadvertent rotation of the spindle. The threaded part of the spindle has one recess. The inner surface of the threaded bore of the body in which the threaded part is inserted has a projection, which is directed against the at least one threaded part and, in a position of the spindle in which it faces the flattened portion or recess, touches the threaded part on the flattened portion or in the recess, whereas in positions of the spindle in which it does not face a flattened portion or recess, presses against the threaded part.

26 Claims, 6 Drawing Sheets

(56) References Cited

U.S. PATENT DOCUMENTS

| | | | | |
|---|---|---|---|---|
| 3,921,294 | A | * | 11/1975 | Wallshein ................ A61C 7/10 433/7 |
| 4,354,832 | A | | 10/1982 | Wallshein |
| 4,379,693 | A | * | 4/1983 | Wallshein ................ A61C 7/10 433/7 |
| 4,482,318 | A | * | 11/1984 | Forster .................... A61C 7/10 433/7 |
| 5,281,133 | A | | 1/1994 | Farzin-Nia |
| 5,472,344 | A | * | 12/1995 | Binder .................... A61C 7/10 433/7 |
| 8,821,156 | B2 | * | 9/2014 | Ehrenberger ........... A61C 7/10 433/7 |
| 9,283,060 | B2 | * | 3/2016 | Peuker .............. B05C 17/00576 |
| 9,642,679 | B2 | | 5/2017 | Montalban |
| 2002/0001789 | A1 | | 1/2002 | Forster |
| 2002/0142259 | A1 | * | 10/2002 | Ceppatelli ................ A61C 7/10 433/7 |
| 2007/0218416 | A1 | * | 9/2007 | Keles ...................... A61C 7/10 433/7 |
| 2007/0275341 | A1 | * | 11/2007 | Hanks ..................... A61C 7/10 433/7 |
| 2008/0171300 | A1 | | 7/2008 | Forster |
| 2017/0175795 | A1 | * | 6/2017 | Hess ................. A61B 17/7032 |

FOREIGN PATENT DOCUMENTS

| | | |
|---|---|---|
| DE | 10 2007 002 040 A1 | 7/2008 |
| DE | 10 2014 213 900 A1 | 1/2015 |
| JP | 2016-056844 A | 4/2016 |

* cited by examiner

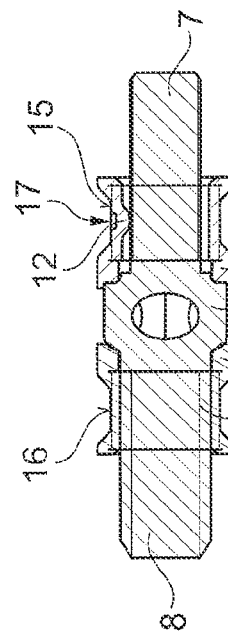
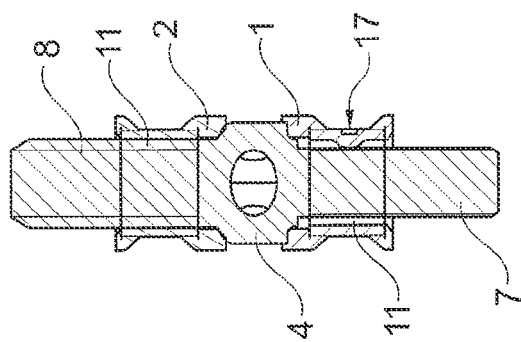
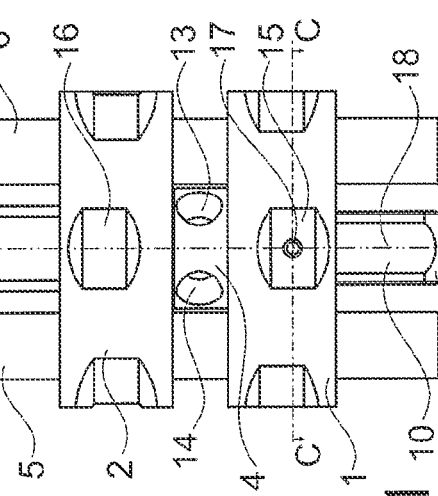
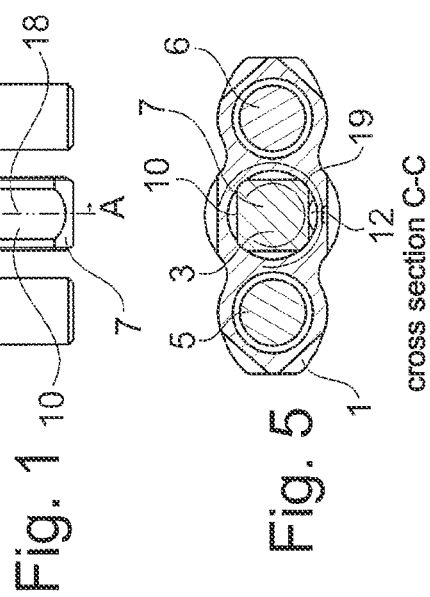

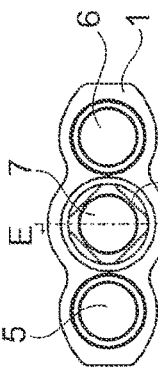
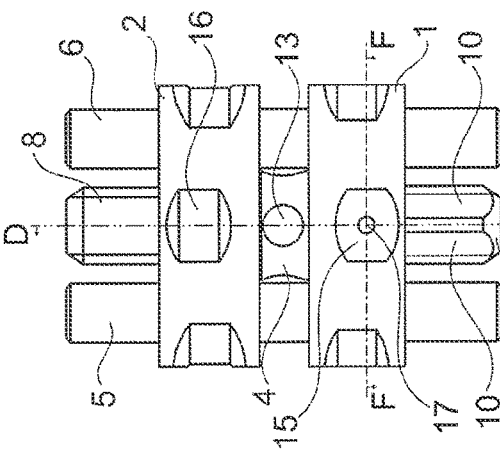
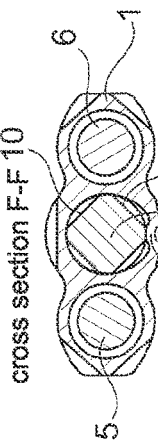
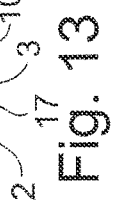
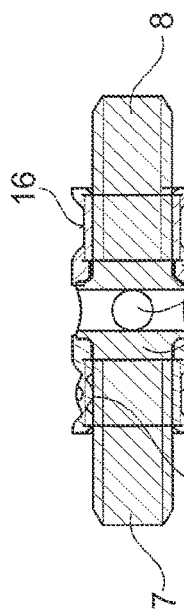
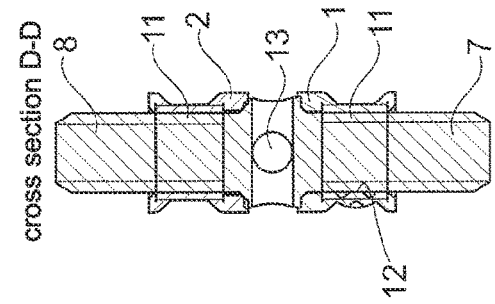
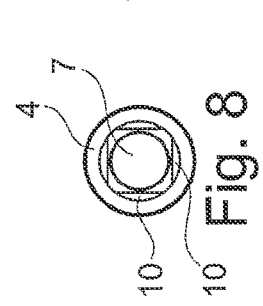
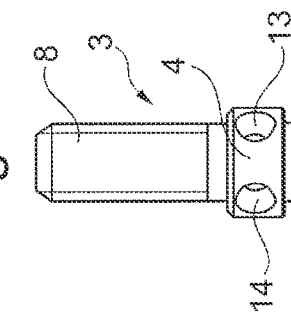

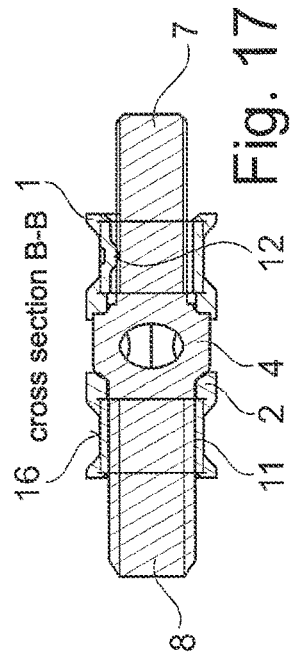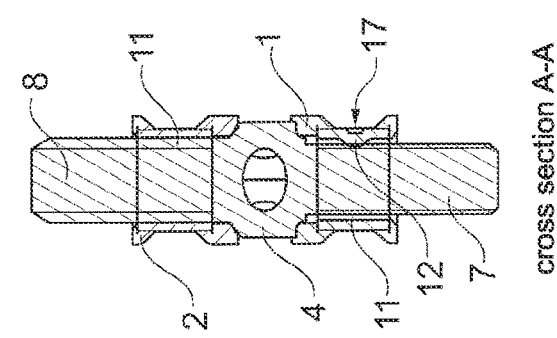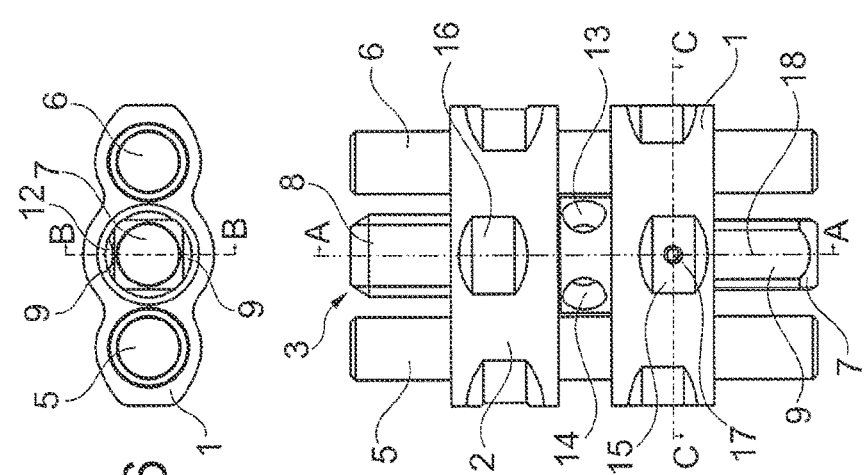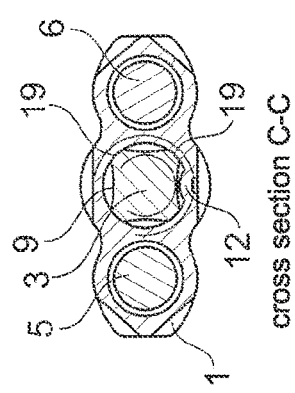

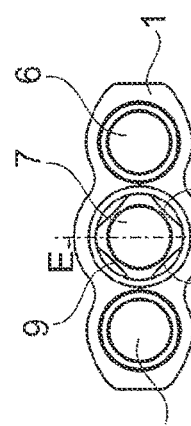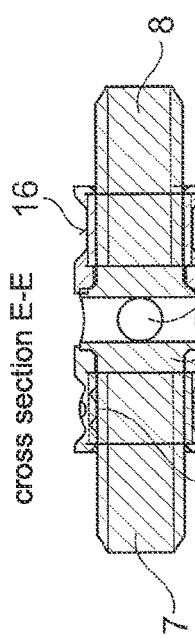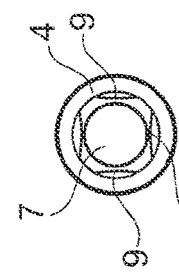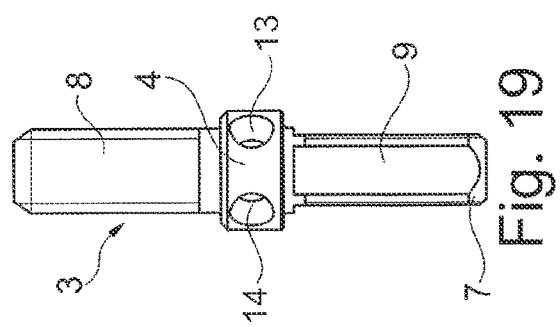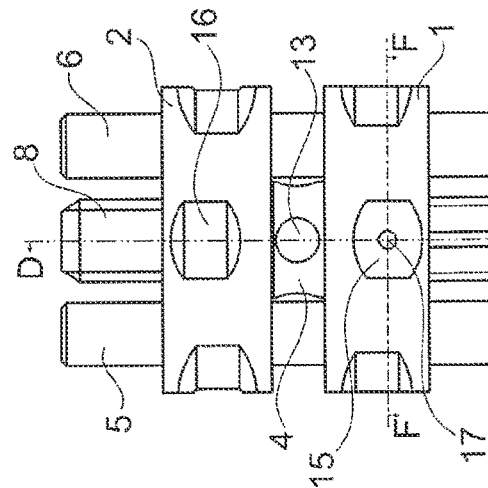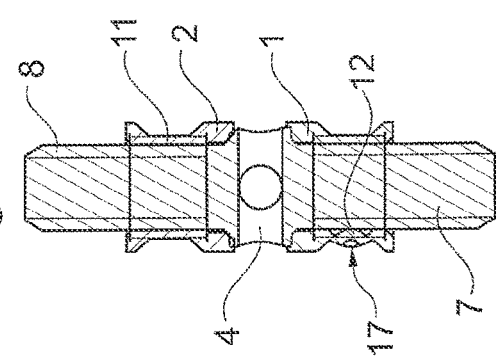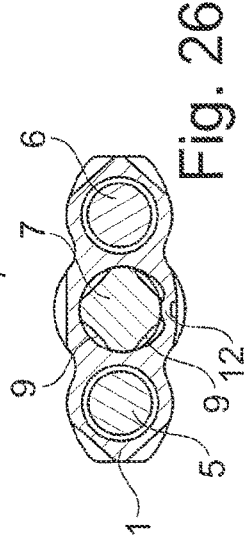

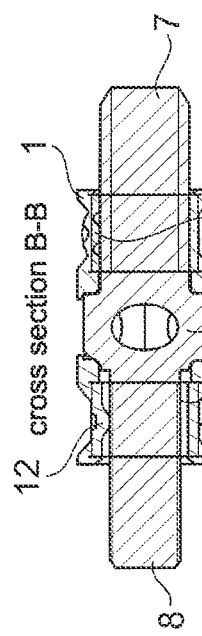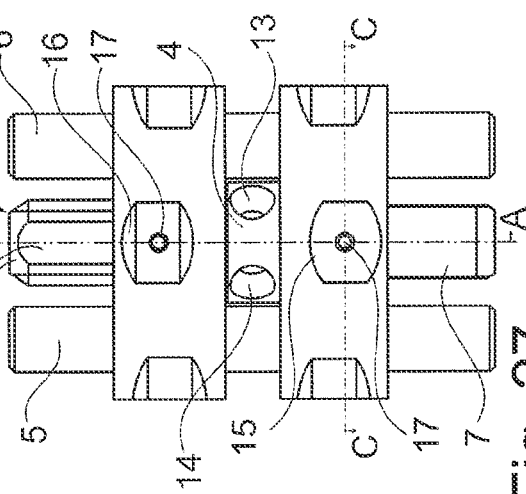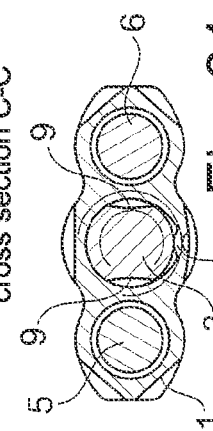

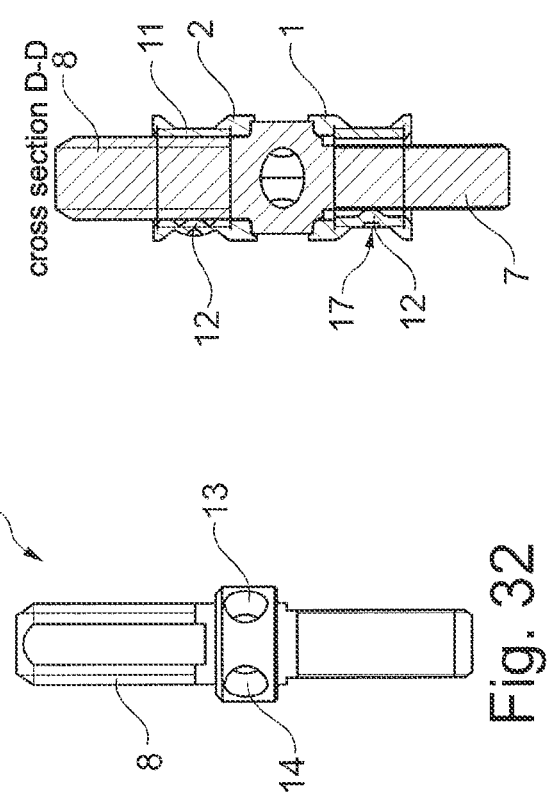

ORTHODONTIC EXPANSION SCREW

CROSS-REFERENCE TO RELATED APPLICATIONS

This continuation application claims priority to PCT/EP2020/053201 filed on Feb. 7, 2020 which has published as WO 2020/165053 A1 and also the German application number 10 2019 103 348.9 filed on Feb. 11, 2019, the entire contents of which are fully incorporated herein with these references

DESCRIPTION

Field of the Invention

The present invention generally relates to orthodontics. More particularly, the present invention relates to an orthodontic expansion screw.

Background of the Invention

The invention proceeds from an orthodontic expansion screw with the features indicated in the preamble to claim 1. Such an expansion screw is disclosed in DE 10 2007 002 040 B4.

The actuating part of the known expansion screw has an outer cross section that deviates from the circular form in order to make an inadvertent rotation of the spindle more difficult. A metal band presses on the actuating part in a radial direction, and thereby acts as a friction brake for the spindle, which holds the spindle in those angular positions in which the metal band assumes the smallest distance from the longitudinal axis of the spindle due to the shape of the actuating part deviating from the circular form. In the known expansion screw, the ends of the metal band are fastened, in particular welded, to the two straight-line guiding means. While the metal band generates a well-defined inhibition, the disadvantage to this solution is that it requires a separate component, which must be fastened to the two straight-line guiding means, which in the known expansion screw are designed as cylindrical pins.

Also known from DE 10 2007 002 040 B4 is to realize an inhibition by slightly crimping the female thread of the expansion screw body, into which a threaded part of the spindle engages. While this avoids a separate component, it is disadvantageous that the scope of the inhibition generated in this way can only be reproduced with difficulty, so that there are significant differences in inhibition within a series of expansion screws.

SUMMARY OF THE INVENTION

An object of the present invention is to provide a way in which a readily reproducible inhibition of the spindle in predefined positions of the spindle can be realized in an orthodontic expansion screw, without requiring a separate component for this purpose.

This object is achieved by an orthodontic expansion screw with the features indicated in claim 1.

Claim 2 indicates a second solution to the object that is based on the same principle.

Advantageous further refinements of the invention are the subject of dependent claims.

The solution according to claim 1 provides a well-defined inhibition of the spindle without a separate component, and avoids the effort that would otherwise be expended for its assembly. This is achieved by virtue of the fact that the at least one threaded part of the spindle has at least one recess that extends in its longitudinal direction and is open in a radial direction, and that the inner surface of the threaded bore of the body in which the at least one threaded part is inserted has a projection, which is directed against the at least one threaded part and, in a position of the spindle in which it faces the at least one recess, protrudes into the recess, whereas it presses against the threaded part of the spindle in positions of the spindle in which it does not face any recess in the threaded part. Contrary to the teaching of DE 10 2007 002 040 B4, the intended inhibition of the spindle does not take place by exposing the actuating part—the spindle head—to a force, but rather by acting directly on the threaded part of the spindle. However, the threaded part of the spindle is not acted upon simply by virtue of the fact that the projection formed in the threaded bore of the body continuously presses with a constant force against the thread of the spindle and counters the spindle rotation with a constant frictional force, but rather by virtue of the fact that the projection protrudes into the recess formed in the threaded part of the spindle. The projection in the recess does not necessarily press on the threaded part of the spindle, but preferably does do so, and specifically less strongly than when pressing against the thread outside of the recess. As a result, the force that must be applied to overcome the inhibition of the spindle increases progressively while turning the spindle, until the projection has left the recess. By forming the recess, the thread of at least one threaded part of the spindle no longer has a constant outer diameter. According to the invention, this provides a well-defined and reproducible inhibition at locations of the spindle that depend on the position of the recess in the threaded part, and no separate component is required to bring about the reproducible inhibition.

The expansion screw according to the invention has at least two bodies, the mutual distance of which can be changed by means of a spindle. However, there are also orthodontic expansion screws that have not just a single pair of bodies whose mutual distance can be changed by a spindle, but rather have two or three pairs of bodies whose mutual distance can be changed by a respective separate, second or third spindle. Such an expansion screw is referred to as a multisector screw. The two or three pairs of bodies are connected to form a single assembly therein. The protection of claims 1 and 2 is intended to include multisector screws. This is why claims 1 and 2 indicate that the orthodontic expansion screw has "at least two bodies".

The solution indicated in claim 2 differs from the solution indicated in claim 1 in that at least one threaded part of the spindle has a flattened portion that extends in its longitudinal direction instead of a recess that extends in its longitudinal direction and is open in a radial direction. The projection formed in the threaded bore of the body in which the threaded part of the spindle is located is directed against the flattened portion in those locations of the spindle in which its inhibition is to be possible. If the spindle is intentionally turned out of such an obstructed position in which the projection is directed against the middle of the flattened portion in relation to the circumferential direction of the spindle, the edge of the flattened portion turning past the projection rises up in front of the projection until the latter slides onto the non-flattened section of the thread. Accordingly, just as the case with the solution according to claim 1, the force that must be applied to overcome the inhibition of the spindle rises progressively until the projection has left the flattened area of the threaded part. Even the second solution of the object underlying the invention yields a defined and reproducible inhibition without requiring a separate component in the expansion screw for this purpose, because the thread of at least one threaded part of the spindle no longer has a constant outer diameter.

If the orthodontic expansion screw has a spindle with two threaded parts that proceed in mutually opposite directions from the actuating part, both bodies of the threaded screw can have a projection in their threaded bore, and both threaded parts of the spindle can have a recess or flattened portion that extends in the longitudinal direction of the spindle. However, it is basically enough that only one of the threaded parts have a recess or flattened portion, and accordingly that only one of the two bodies of the expansion screw have a projection in its threaded bore.

The projection is intended to press on the thread of the threaded part outside of the recess or flattened portion of the threaded part of the spindle. The projection preferably touches the spindle in each of its positions, but with less pressure or no pressure in the recess and on the flattened portion, because the recess and the flattened portion jump back relative to the full thread. If the projection presses against the threaded part of the spindle in each of its positions, the advantage is that the spindle has no play when the projection presses against the flattened portion or into the recess.

The invention is not limited to a special type of thread.

In order to make it easier for the projection to slide onto the threaded part of the spindle, it is preferably convex or crowned in design, and in the longitudinal direction of the spindle preferably extends over a length that is greater than the thread pitch of the spindle.

The recess or flattened portion expediently extends on the threaded part of the spindle over a length that is just as long as the length by which the bodies of the expansion screw can be adjusted by turning the spindle. The recess or the flattened portion preferably extends over the entire length of the at least one threaded part or both threaded parts.

More than just one recess or flattened portion can be present on the respective threaded part. The more recesses or flattened portions that are present in the circumferential direction, distributed on the threaded part or threaded parts of the spindle, the more positions of the spindle there are in which the inadvertent rotation of the spindle can be prevented or impeded. Two recesses or flattened portions lying diametrically opposite each other are preferably present, or four recesses or flattened portions that lie diametrically opposite each other in pairs. If two recesses or flattened portions are present, the position of the spindle can remain in a position after a respective half a revolution in which an inadvertent rotation of the spindle is prevented or impeded. If four recesses or flattened portions are present on the threaded part, this already happens after a respective one fourth of a revolution. In this case, the threaded part is shaped like a square with rounded corners, in whose rounded portions the remaining threads lie. Depending on the specific design of the flattened portion or recess, the threads can extend into the flattened portion or recess with a decreasing thread depth. This is also preferred, so as to ensure that enough engagement exists between the threaded part and the threaded bore that receives it to absorb or transfer the forces arising in the expansion screw during orthodontic treatment.

The ability to hold the spindle after each one fourth turn in a position in which an inadvertent rotation of the spindle is prevented or impeded can also be achieved if the threaded parts of the spindle only have two recesses or flattened portions lying diametrically opposite each other, specifically if the recesses or flattened portions on the one threaded part are offset to each other by a circumferential angle of 90° relative to the recesses or flattened portions on the other threaded part of the spindle.

The projection present in the threaded bore of the one body or both bodies of the expansion screw is preferably designed as an indentation of the respective body of the expansion screw. Such an indentation can be reproducibly generated in an embossing process. By monitoring the feed path of an embossing stamp that does the embossing, the depth of the indentation, and thus the height of the projection, inside of the threaded bore of the body can be generated with low dimensional tolerances.

BRIEF DESCRIPTION OF THE DRAWINGS

Three illustrative embodiments of the expansion screw according to the invention are schematically shown in the attached drawings. Similar or mutually corresponding parts of the two expansion screws are designated with matching reference numbers.

FIG. 1 shows a top view of an expansion screw with a spindle with two threaded parts, of which one is quadruple flattened, with the spindle in a locking position, FIG. 2 shows the longitudinal section A-A through the expansion screw, FIG. 3 shows the view of the end of the expansion screw at which the end of the flattened threaded part is located, FIG. 4 shows the longitudinal section B-B through the expansion screw, FIG. 5 shows the cross section C-C through the expansion screw, FIG. 6 shows a detailed top view of the spindle, FIG. 7 shows the view of the end of the spindle facing away from the flattened threaded part, FIG. 8 shows the view of the opposing end of the spindle, where the end of the flattened threaded part is located, FIG. 9 shows a top view of the expansion screw with the spindle in a switching position, FIG. 10 shows the longitudinal section D-D through the expansion screw, FIG. 11 shows a view of the end of the expansion screw at which the end of the flattened threaded part is located, FIG. 12 shows the longitudinal section E-E through the expansion screw, FIG. 13 shows the cross section F-F through the expansion screw, FIG. 14 shows a top view of an expansion screw with a spindle with two threaded parts, of which one has four recesses lying opposite each other in pairs, with the spindle in a locking position, FIG. 15 shows the longitudinal section A-A through the expansion screw on FIG. 14, FIG. 16 shows the view of the end of the expansion screw at which the end of the threaded part provided with recesses is located, FIG. 17 shows the longitudinal section B-B through the expansion screw according to FIG. 16, FIG. 18 shows the cross section C-C through the expansion screw according to FIG. 17, FIG. 19 shows a detailed top view of the spindle of the expansion screw on FIG. 14, FIG. 20 shows the view of the end of the spindle from FIG. 19, which faces away from the threaded part provided with recesses, FIG. 21 shows the view of the opposing end of the spindle from FIG. 19, at which the end of the threaded section provided with recesses is located, FIG. 22 shows a top view of the expansion screw from FIG. 14 with the spindle in a switching position, FIG. 23 shows the longitudinal section D-D through the expansion screw according to FIG. 22, FIG. 24 shows a view of the end of the expansion screw according to FIG. 22, at which the end of the threaded part provided with recesses is located, FIG. 25 shows the longitudinal section E-E through the expansion screw according to FIG. 24, FIG. 26 shows the cross section F-F through the expansion screw according to FIG. 22, FIG. 27 shows a top view of an expansion screw, in which the spindle has two threaded parts, each of which has two recesses lying diametrically opposite each other, wherein the recesses in one threaded part are offset by an angle of 90° relative to the recesses in the other threaded part, and the spindle is in a locking position with one of its two threaded parts, FIG. 28 shows the longitudinal section A-A through the expansion screw from FIG. 27, FIG. 29 shows the view of the end of the expansion screw from FIG. 27, which is located at the bottom in the illustration on FIG. 27, FIG. 30 shows the longitudinal section B-B through the expansion screw according to FIG. 29, FIG. 31 shows the cross section C-C through the expansion screw according to FIG. 27, FIG. 32 shows a detailed top view of the spindle of the expansion screw from FIG. 27, but in a position as on FIG. 35, FIG. 33 shows the view of the end of the spindle from FIG. 32, which is located at the top in the illustration on FIG. 32, FIG. 34 shows the view of the opposite end of the spindle from FIG. 32, FIG. 35 shows a top view of the expansion screw from FIG. 27, in which the spindle is rotated by 90° from the position shown on FIG. 27, FIG. 36 shows the longitudinal section D-D through the expansion screw according to FIG. 35, FIG. 37 shows a view of the end of the expansion screw from FIG. 35, which is located at the bottom in the illustration on FIG. 35, FIG. 38 shows the longitudinal section E-E through the expansion screw according to FIG. 37, and FIG. 39 shows the cross section F-F through the expansion screw according to FIG. 35.

DETAILED DESCRIPTION OF THE PREFERRED EMBODIMENTS

The expansion screw shown on FIGS. 1 to 13 has two preferably identically designed bodies 1 and 2, whose mutual distance can be varied by means of a spindle 3, which has a central actuating part 4 from which two threaded parts with an opposite winding sense proceed in a mutually opposite direction. The first threaded part 7 is rotatably mounted in the first body 1, and the second thread part 8 is rotatably mounted in the second body 2. For this purpose, each of the two bodies 1 and 2 incorporates a continuous threaded bore 11, into which a respective one of the two threaded parts 7 and 8 is engaged. Accordingly, the two threaded bores 11 align with each other, and have an opposite winding sense corresponding to the two threaded parts 7 and 8. The pitch of the threads on the two threaded parts 7 and 8 and in the threaded bores 11 matches.

Provided on both sides of the spindle 3 are two cylindrical guide pins 5 and 6, which are inserted in continuous bores of the two bodies 1 and 2, which are matched thereto and align with each other in pairs. The guide pins 5 and 6 form straight-line guiding means, which guide the two bodies 1 and 2 along two mutually parallel guiding axes, avoiding a relative rotation of the two bodies 1 and 2 given a change in their distance.

Both guide pins 5 and 6 are not necessarily present. In principle, suitable straight-line guiding means can also be formed by the spindle 3 itself and a single guide pin parallel to the spindle 3, but embodiments with two guide pins are preferred due to a symmetrical introduction of the force emanating from the spindle 3 into the two bodies 1 and 2.

In principle, it is further also possible to use just a single threaded part in place of a spindle 3 with two threaded parts 7 and 8, and here turn the spindle into a threaded bore in only one of the two bodies and rotatably, but immovably, connect the spindle with the other body of the expansion screw, in particular by rotatably mounting the actuating part of the spindle in a chamber of one of the two bodies of the expansion screw, wherein the single threaded part of the spindle protrudes from said chamber, and is engaged into the threaded bore of the other body of the expansion screw.

In the first embodiment according to FIGS. 1 to 13, the actuating part 4 has two transverse bores 13 and 14 that intersect each other at a right angle, and are visible in particular on FIGS. 1, 6, 9, 10 and 12. In order to rotate the spindle 3, an adjusting tool, for example a pin, can be introduced, which can be used as a lever for rotating the spindle 3. When the actuating part 4 is turned, the distance between the two bodies 1 and 2 changes, and they slide on the guiding pins 5 and 6, so that the two bodies 1 and 2 are guided along a straight line, and the two bodies 1 and 2 are prevented from twisting relative to each other.

To prevent the expansion screw from spontaneously adjusting in the mouth of a patient in which it was placed for an orthodontic treatment, the expansion screw incorporates a device that prevents or at least impedes an unintended rotation of the spindle 3 relative to the two bodies 1, 2 in both rotational directions of the spindle 3 while exposed to the effects on the expansion screw arising in the mouth. For this purpose, one of the two threaded parts, specifically the first threaded part 7, is flattened over the entire length in such a way as to give it the shape of a square with rounded corners as viewed in the longitudinal direction of the spindle 3, see in particular FIGS. 3 and 8. This is why the threads of the first threaded part 7 no longer extend completely around the latter, but instead are essentially confined to the area of the still present corners of the shape of a square with rounded "corners" that was created by flattening the first threaded part 7.

A corresponding depression 15 or 16 is located in the two bodies 1 and 2 over the spindle 3. A trough 17 is formed in the depression 15 over the first threaded part 7 of the spindle 3, and is formed in an embossing process by pushing in the depression 15 at its deepest location over the longitudinal axis of the threaded part 7 via an embossing stamp. This embossing process created a projection 12 in the threaded bore 11 in the first body 1 under the trough 17, see FIGS. 2 to 4, 10, 12 and 13. The trough 17, the projection 12 and the flattened portions 10 are not shown to scale on the figures, but rather only in principle, so as to illustrate their operating principle.

FIGS. 1 to 5 show the spindle 3 in a position in which the projection 12 having a spherical contour touches the first threaded part 7 of the spindle 3 on a central line 18, which coincides with intersection line A-A on FIG. 1. This position is referred to below as the locking position. If the object is to unscrew the spindle 3 from this locking position, the edge of the flattened portion 10 rises up in front of the projection 12, and opposes the rotation of the spindle 3 with an inhibiting force, which increases until the next rounded portion 19 of the first threaded part 7 reaches the projection 12. This position of the spindle 3 is shown on FIGS. 10 to 13, and will be referred to as the switching position below, because the spindle 3 can be turned from the latter toward the right or left into the next locking position.

The resistance that must be overcome while rotating the spindle 3 from a locking position into a switching position can prevent an inadvertent rotation of the spindle 3.

In the first embodiment of an expansion screw according to the invention shown on FIGS. 1 to 13, the spindle proceeds from one locking position into the next locking position by turning by a respective 90°, so that the distance between the two bodies 1 and 2 of the expansion screw can be changed by the orthodontist by turning the spindle by a respective 90°, wherein the resultant change in the distance between the two bodies 1 and 2 depends on the pitch of the thread of the spindle 3.

The second embodiment of an expansion screw according to the invention shown on FIGS. 14 to 29 only differs from the first embodiment shown on FIGS. 1 to 13 in that concave surfaces are formed in place of flattened portions 10 of the first threaded part 7, which are bordered by a flat surface, so that the first threaded part 7 has four recesses 9 extending in its longitudinal direction, in which a projection 12 formed in the threaded bore 11 of the first body 1 can be higher than in the first embodiment. The resistance that the spindle 3 must overcome while being unscrewed from its locking position (FIG. 16) can thus be greater than in the first embodiment. As a consequence, a stronger inhibition of the spindle 3 can be achieved with an expansion screw according to the second embodiment than with an expansion screw according to the first embodiment.

Apart from the fact that recesses 9 are provided on the first threaded part 7 instead of flattened portions 10 in the second embodiment, the two embodiments are the same, so that reference can be made back to the description of the first embodiment for details relating to the second embodiment.

The third embodiment of an expansion screw according to the invention shown on FIGS. 27 to 39 only differs from the second embodiment in that not four recesses 9, but rather only two recesses 9 lying diametrically opposite each other are formed on the first threaded part 7, and that two additional recesses 9 lying diametrically opposite each other are formed on the second threaded part 8 and arranged in such a way as to be offset by 90° in the circumferential direction against the recesses 9 in the first threaded part 7. In addition, a projection 12 is formed not just in the first body 1, but also in the second body 2 at the corresponding location by also embossing a trough 17 in the threaded bore 11 of the second body 2. The advantage to this third embodiment of the expansion screw is that more of the thread has been retained on both threaded parts 7 and 8 than in the first and second embodiment on the first threaded part 7, so that the thread of the first threaded part 7 can absorb larger forces, and both threaded parts 7 and 8 can be exposed to about the same load. The advantage to the first and second embodiment, specifically that the spindle 3 must only be rotated by 90° from locking position to locking position, has been retained.

REFERENCE LIST

1 First body
2 Second body
3 Spindle
4 Actuating part
5 Straight-line guiding means, guide pin
6 Straight-line guiding means, guide pin
7 Threaded part
8 Threaded part
9 Recess
10 Flattened portion
11 Threaded bore
12 Projection
13 Transverse bore
14 Transverse bore
15 Depression
16 Depression
17 Trough
18 Central line
19 Rounded portion

What is claimed is:

1. An orthodontic expansion screw, comprising:
at least two bodies, arranged at a mutual distance which can be changed by means of a spindle, which engages both bodies, wherein the spindle has an actuating part, from which at least one threaded part proceeds, which is engaged in a threaded bore of one of the two bodies;
a straight-line guiding means, which engage both bodies and guide them along two mutually parallel guiding axes, avoiding a relative rotation of the bodies given a change in their mutual distance; and
a device for preventing or impeding an inadvertent rotation of the spindle relative to the bodies;
wherein the at least one threaded part of the spindle has at least one recess that extends in its longitudinal direction and is open in a radial direction, and that an inner surface of the threaded bore of the body in which the at least one threaded part is inserted has a projection, which is directed against the spindle and, in a position of the spindle in which the projection faces the at least one recess, the projection protrudes into the recess, whereas when the projection faces the at least one threaded part, the projection presses against the at least one threaded part;
wherein the projection is not a separately manufactured part in comparison to the body in which it is part of, but rather the projection is integrally formed from part of the body in an embossing process.

2. The expansion screw according to claim 1, wherein the projection touches the threaded portion of the spindle in each of its positions.

3. The expansion screw according to claim 2, wherein the projection abuts against the threaded part of the spindle under a pressure in each of its positions.

4. The expansion screw according to claim 1, wherein the projection is convex in design.

5. The expansion screw according to claim 4, wherein the projection is spherical in design.

6. The expansion screw according to claim 1, wherein an extension of the protrusion is greater in the longitudinal direction of the spindle than in the circumferential direction of the spindle.

7. The expansion screw according to claim 1, wherein an extension of the protrusion is greater in the longitudinal direction of the spindle than the pitch of the thread of the spindle.

8. The expansion screw according to claim 1, wherein the at least one recess extends over the entire length of the at least one threaded part.

9. The expansion screw according to claim 1, wherein the at least one recess is one of two or four recesses which are present on the at least one threaded part, which lie diametrically opposite each other in pairs.

10. The expansion screw according to claim 9, wherein at least one threaded part is designed as a square with rounded corners, in which the thread is formed.

11. The expansion screw according to claim 10, wherein the thread of the at least one threaded part also extends with a smaller thread depth at least partially into the at least one recess ox portion of the at least one threaded part.

12. The expansion screw according to claim 1, wherein the at least one threaded part of the spindle comprises two threaded parts, which extend in mutually opposite directions proceeding from the actuating part, and the at least one recess comprises two recesses on each of the threaded parts lying diametrically opposite each other, wherein the two recesses on the one threaded part are offset to each other by a circumferential angle of 90° relative to the two recesses on the other threaded part around the longitudinal axis of the spindle.

13. The expansion screw according to claim 1, wherein the device for preventing or impeding rotation acts in both rotational directions of the spindle.

14. An orthodontic expansion screw, comprising: at least two bodies, arranged at a mutual distance which can be changed by means of a spindle, which engages both bodies, wherein the spindle has an actuating part, from which at least one threaded part proceeds, which is engaged in a threaded bore of one of the two bodies;

a straight-line guiding means, which engage both bodies and guide them along two mutually parallel guiding axes, avoiding a relative rotation of the bodies given a change in their mutual distance; and a device for preventing or impeding an inadvertent rotation of the spindle relative to the bodies; wherein the at least one threaded part of the spindle has at least one flattened portion extending in its longitudinal direction, and that inner surface of the threaded bore of the body in which the at least one threaded part is inserted has a projection, which is directed against the spindle and, in positions of the spindle in which the projection does not face the at least one flattened portion, the projection presses against the at least one threaded part, whereas in positions of the spindle in which is directed against the at least one flattened portion, the projection does not touch the at least one flattened portion, or does so with less pressure than in positions in which does not face the at least one flattened portion;

wherein the projection is not a separately manufactured part in comparison to the body in which it is a part of, but rather the projection is integrally formed from part of the body in an embossing process.

15. The expansion screw according to claim 14, wherein the projection touches the threaded portion of the spindle in each of its positions.

16. The expansion screw according to claim 15, wherein the projection abuts against the threaded part of the spindle under a pressure in each of its positions.

17. The expansion screw according to claim 14, wherein the projection is convex in design.

18. The expansion screw according to claim 17, wherein the projection is spherical in design.

19. The expansion screw according to claim 14, wherein an extension of the protrusion is greater in the longitudinal direction of the spindle than in the circumferential direction of the spindle.

20. The expansion screw according to claim 14, wherein an extension of the protrusion is greater in the longitudinal direction of the spindle than the pitch of the thread of the spindle.

21. The expansion screw according to claim 14, wherein the at least one flattened portion extends over the entire length of the at least one threaded part.

22. The expansion screw according to claim 14, wherein the at least one recess flattened portion is one of two or four recesses portions which are present on the at least one threaded part, which lie diametrically opposite each other in pairs.

23. The expansion screw according to claim 22, wherein at least one threaded part is designed as a square with rounded corners, in which the thread is formed.

24. The expansion screw according to claim 23, wherein the thread of the at least one threaded part also extends with a smaller thread depth at least partially into the at least one flattened portion of the at least one threaded part.

25. The expansion screw according to claim 14, wherein the at least one threaded part of the spindle comprises two threaded parts, which extend in mutually opposite directions proceeding from the actuating part, and the at least one flattened portion comprises two flattened portions on each of the threaded parts lying diametrically opposite each other, wherein the two flattened portions on the one threaded part are offset to each other by a circumferential angle of 90° relative to the two flattened portions on the other threaded part around the longitudinal axis of the spindle.

26. The expansion screw according to claim 14, wherein the device for preventing or impeding rotation acts in both rotational directions of the spindle.

* * * * *

UNITED STATES PATENT AND TRADEMARK OFFICE
CERTIFICATE OF CORRECTION

| | |
|---|---|
| PATENT NO. | : 12,016,746 B2 |
| APPLICATION NO. | : 17/444590 |
| DATED | : June 25, 2024 |
| INVENTOR(S) | : Michael Regelmann |

It is certified that error appears in the above-identified patent and that said Letters Patent is hereby corrected as shown below:

In the Claims

Column 9, Claim 11, Line 18, "ox portion of" should read --portion of--.

Column 9, Claim 14, Line 52, "positions of the spindle in which is directed against" should read --positions of the spindle in which the projection is directed against--.

Signed and Sealed this
Twentieth Day of August, 2024

*Katherine Kelly Vidal*

Katherine Kelly Vidal
*Director of the United States Patent and Trademark Office*